United States Patent
Sethi et al.

(10) Patent No.: US 12,009,975 B2
(45) Date of Patent: Jun. 11, 2024

(54) METHOD AND SYSTEM FOR GENERATING AN UPGRADE RECOMMENDATION FOR A COMMUNICATION NETWORK

(71) Applicant: Dell Products L.P., Round Rock, TX (US)

(72) Inventors: Parminder Singh Sethi, Ludhiana (IN); Lakshmi Saroja Nalam, Bangalore (IN); Shelesh Chopra, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/871,596

(22) Filed: Jul. 22, 2022

(65) Prior Publication Data

US 2024/0031227 A1    Jan. 25, 2024

(51) Int. Cl.
*H04L 41/082* (2022.01)
*H04L 41/14* (2022.01)
*H04L 43/00* (2022.01)
*H04L 43/08* (2022.01)

(52) U.S. Cl.
CPC ......... *H04L 41/082* (2013.01); *H04L 41/145* (2013.01); *H04L 43/08* (2013.01); *H04L 43/14* (2013.01)

(58) Field of Classification Search
CPC ..... H04L 41/082; H04L 41/145; H04L 43/08; H04L 43/14; H04L 41/0883; H04L 41/14; H04L 45/121; H04L 47/283
See application file for complete search history.

(56) References Cited

U.S. PATENT DOCUMENTS

| 6,195,760 | B1 | 2/2001 | Chung et al. |
| 7,251,745 | B2 | 7/2007 | Koch et al. |
| 7,401,248 | B2 | 7/2008 | Nakahara et al. |

(Continued)

FOREIGN PATENT DOCUMENTS

| CN | 113612635 A | 11/2021 |
| WO | 2017214932 A1 | 12/2017 |

(Continued)

OTHER PUBLICATIONS

Wu, Suzhen et al., "Proactive Data Migration for Improved Storage Availability in Large-Scale Data Centers", IEEE Transactions on Computers, vol. 64, No. 9, Sep. 2015.

*Primary Examiner* — Hitesh Patel
*Assistant Examiner* — Alex H. Tran
(74) *Attorney, Agent, or Firm* — Chamberlain, Hrdlicka, White, Williams & Aughtry; Aly Z. Dossa

(57) ABSTRACT

A method for generating an upgrade recommendation for a communication network includes: analyzing a dataset to generate a request category, in which the dataset comprises at least a request, a response to the request, and a corresponding response time, in which the request and the response are communicated over the communication network; generating a network slice corresponding to the request category; executing an emulation using the network slice and the request to generate an emulated response time for the request; comparing the emulated response time against the corresponding response time; determining, based on the comparison, a response time variation for the request; and generating the upgrade recommendation based on the response time variation.

16 Claims, 6 Drawing Sheets

(56) References Cited

U.S. PATENT DOCUMENTS

| | | | |
|---|---|---|---|
| 7,525,749 B2 | 4/2009 | Maejima et al. | |
| 7,590,981 B2 | 9/2009 | Gupta et al. | |
| 7,966,391 B2* | 6/2011 | Anderson | H04L 41/28 |
| | | | 703/22 |
| 8,078,448 B1 | 12/2011 | Wohlberg et al. | |
| 8,364,799 B2 | 1/2013 | Sakai | |
| 8,918,673 B1 | 12/2014 | Rangaiah et al. | |
| 9,026,260 B1* | 5/2015 | Thornley | H02J 13/00002 |
| | | | 700/292 |
| 9,397,930 B2* | 7/2016 | Drobinsky | H04L 47/12 |
| 9,900,215 B2* | 2/2018 | Yang | H04L 67/52 |
| 10,785,123 B2* | 9/2020 | Gonguet | H04L 43/067 |
| 11,424,989 B2* | 8/2022 | Jeuk | H04L 47/74 |
| 11,588,893 B1* | 2/2023 | Sharma | H04L 43/028 |
| 11,595,269 B1* | 2/2023 | Ghosh | G16Y 10/75 |
| 2002/0138226 A1 | 9/2002 | Doane | |
| 2005/0216800 A1 | 9/2005 | Bicknell et al. | |
| 2006/0129771 A1 | 6/2006 | Dasgupta et al. | |
| 2007/0079170 A1 | 4/2007 | Zimmer et al. | |
| 2007/0198524 A1 | 8/2007 | Branda et al. | |
| 2008/0222218 A1 | 9/2008 | Richards et al. | |
| 2009/0307522 A1 | 12/2009 | Olson et al. | |
| 2011/0113224 A1 | 5/2011 | Isshiki et al. | |
| 2012/0072571 A1 | 3/2012 | Orzell et al. | |
| 2013/0103977 A1 | 4/2013 | Zimmermann | |
| 2014/0376385 A1 | 12/2014 | Boss et al. | |
| 2015/0278219 A1 | 10/2015 | Phipps | |
| 2016/0162280 A1 | 6/2016 | Murayama et al. | |
| 2016/0239395 A1 | 8/2016 | Madsen et al. | |
| 2018/0113728 A1 | 4/2018 | Musani et al. | |
| 2018/0262979 A1 | 9/2018 | Wang et al. | |
| 2019/0379595 A1* | 12/2019 | Ur | G06N 3/08 |
| 2020/0110655 A1 | 4/2020 | Harwood et al. | |
| 2020/0133772 A1 | 4/2020 | Dalmatov et al. | |
| 2020/0156243 A1 | 5/2020 | Ghare et al. | |
| 2020/0264930 A1 | 8/2020 | Mandagere et al. | |
| 2021/0153044 A1* | 5/2021 | Ramanathan | H04L 43/20 |
| 2021/0165768 A1 | 6/2021 | D'halluin et al. | |
| 2022/0070648 A1 | 3/2022 | Krishan | |
| 2022/0138081 A1* | 5/2022 | Varma | G06F 11/3684 |
| | | | 717/124 |
| 2022/0158926 A1* | 5/2022 | Wennerström | H04L 43/20 |
| 2022/0179683 A1 | 6/2022 | Verma et al. | |
| 2022/0272142 A1* | 8/2022 | Li | H04L 12/1831 |
| 2022/0283784 A1* | 9/2022 | Degen | G06F 8/20 |
| 2022/0337493 A1 | 10/2022 | Sant et al. | |
| 2022/0337501 A1* | 10/2022 | Sant | H04L 43/0823 |
| 2022/0368602 A1* | 11/2022 | Adhav | H04L 41/145 |
| 2023/0033886 A1* | 2/2023 | Goswami | H04L 43/20 |
| 2023/0037124 A1* | 2/2023 | Mengwasser | H04W 24/10 |

FOREIGN PATENT DOCUMENTS

| | | |
|---|---|---|
| WO | 2021122516 A1 | 6/2021 |
| WO | 2022104396 A1 | 5/2022 |

\* cited by examiner

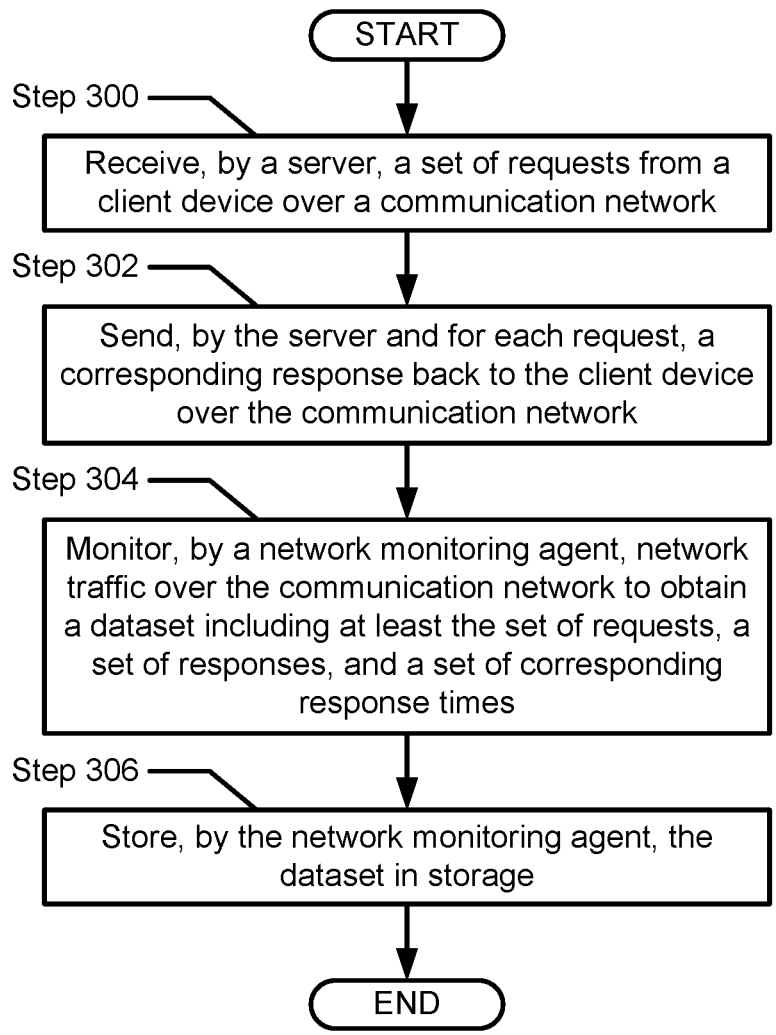
FIG. 3.1

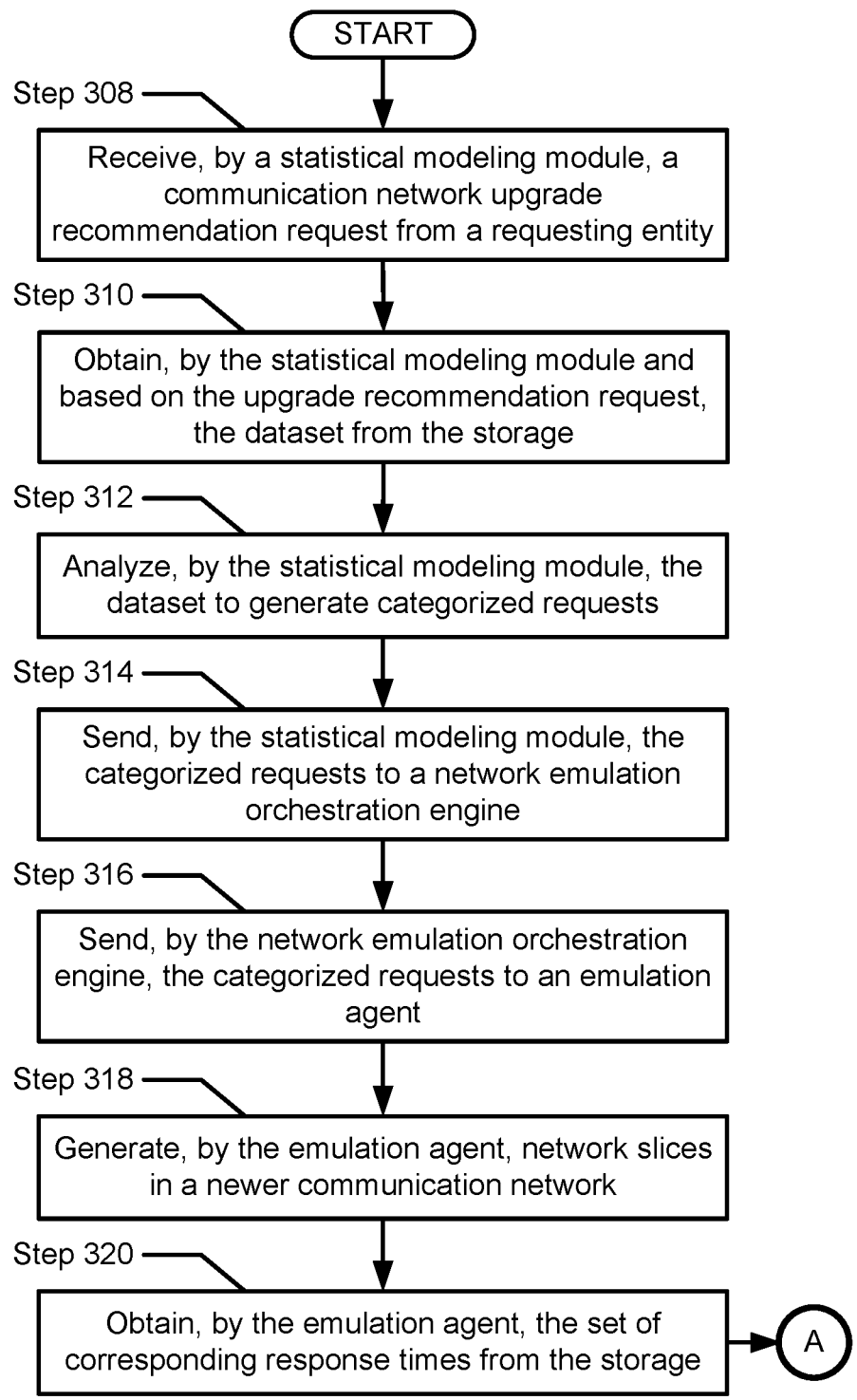
FIG. 3.2

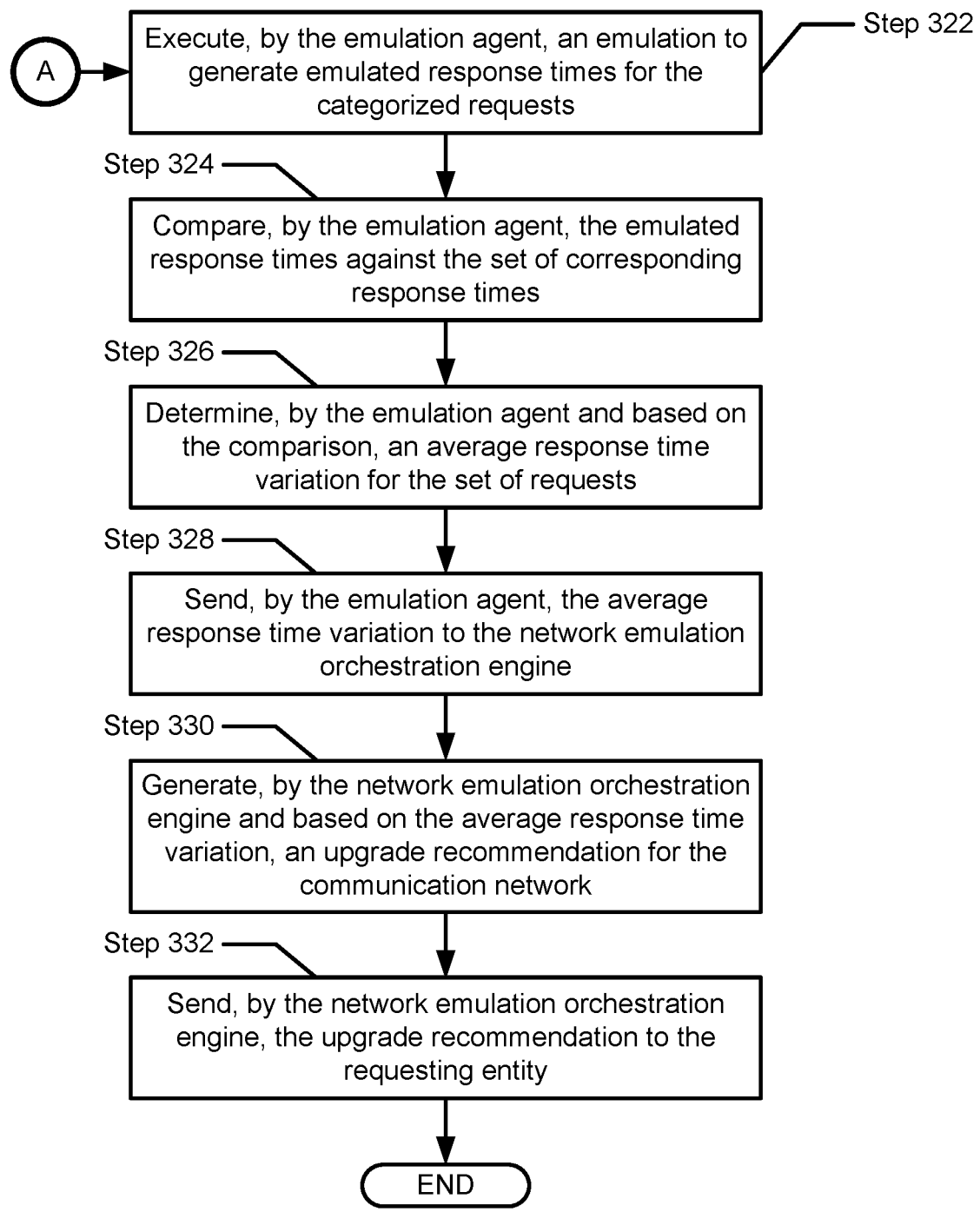
FIG. 3.3

METHOD AND SYSTEM FOR GENERATING AN UPGRADE RECOMMENDATION FOR A COMMUNICATION NETWORK

BACKGROUND

Computing devices may provide services. To provide the services, the computing devices may include hardware components and software components. The software components may store information usable to provide the services using the hardware components.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 3.1-3.3 show a method for generating an upgrade recommendation for a communication network in accordance with one or more embodiments of the invention.

DETAILED DESCRIPTION

Figure 1:
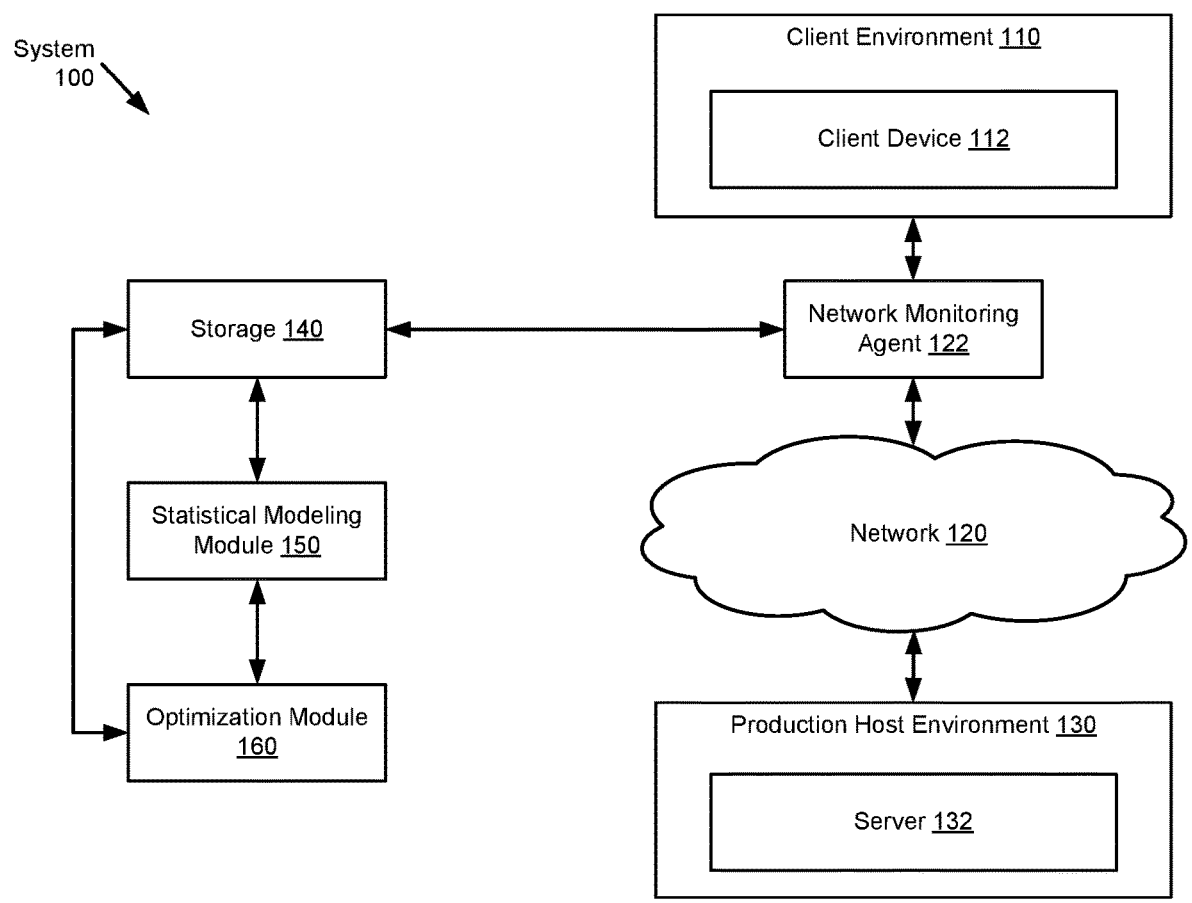
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, a user and/or an administrator of a communication network may want to migrate (e.g., upgrade) the communication network to a newer communication network. Usually, while upgrading to the newer communication network, the user and/or the administrator may experience performance degradation in production workloads (e.g., reading data from a table, writing data to the table, etc.). Upgrading to the newer communication network may also be costly and unnecessary. Embodiments of the invention relate to methods and systems for generating an upgrade recommendation for a communication network. More specifically, various embodiments of the invention may analyze a dataset to generate one or more request categories. An emulation may be executed to generate emulated response times on high bandwidth (BW) and low BW network slices in a newer communication network using the categorized requests. The emulated response time may then be compared against corresponding response time for the request. Based on the comparison, a response time variation for the request may be determined. Finally, the upgrade recommendation for the communication network may be generated based on the response time variation. As a result of these processes, one or more embodiments disclosed herein advantageously provide the user and/or the administrator a much clearer view about upgrading to the newer communication network such that the user and/or the administrator can plan accordingly. In this manner, the user and/or the administrator may experience less performance degradation during production workloads.

The following describes various embodiments of the invention.

FIG. 1 shows a diagram of a system (100) in accordance with one or more embodiments of the invention. The system (100) includes a client environment (CE) (110), a network (120), a network monitoring agent (122), a production host environment (PHE) (130), storage (140), a statistical modeling module (150), and an optimization module (160). The system (100) may include additional, fewer, and/or different components without departing from scope of the invention. Each component may be operably connected to any of the other components via any combination of wired and/or wireless connections. Each component illustrated in FIG. 1 is discussed below.

In one or more embodiments of the invention, the CE (110) may include a client device (112) and the PHE (130) may include a server (132). The client device (112) and the server (132) may be physical or logical devices, as discussed below. In one or more embodiments, the CE (110) may include any number of client devices without departing from the scope of the invention. Similarly, the PHE (130) may include any number of servers without departing from the scope of the invention.

In one or more embodiments of the invention, the client device (112) may include one or more applications (not shown). The applications may be designed and configured to perform one or more operations (e.g., functions, tasks, activities) instantiated by a user and/or an administrator of the client device (112). Examples of the applications may include, but are not limited to: a word processor, a media player, a web browser, a file viewer, an image editor, etc. In one or more embodiments, the administrator may be a user with permission to make changes on the client device (112) that will affect other users of the client device (112).

In one or more embodiments of the invention, while performing these operations, the applications may include functionality to request and use resources (e.g., processors, memory, network BW, etc.) of the client device (112). The applications may perform other types of functionalities not listed above without departing from the scope of the invention.

In one or more embodiments of the invention, the applications may be implemented as computer instructions, e.g., computer code, stored in persistent storage that when executed by a processor(s) of a computing device cause the computing device (e.g., 400, FIG. 4) to provide the functionality of the applications described throughout this application.

Figure 4:
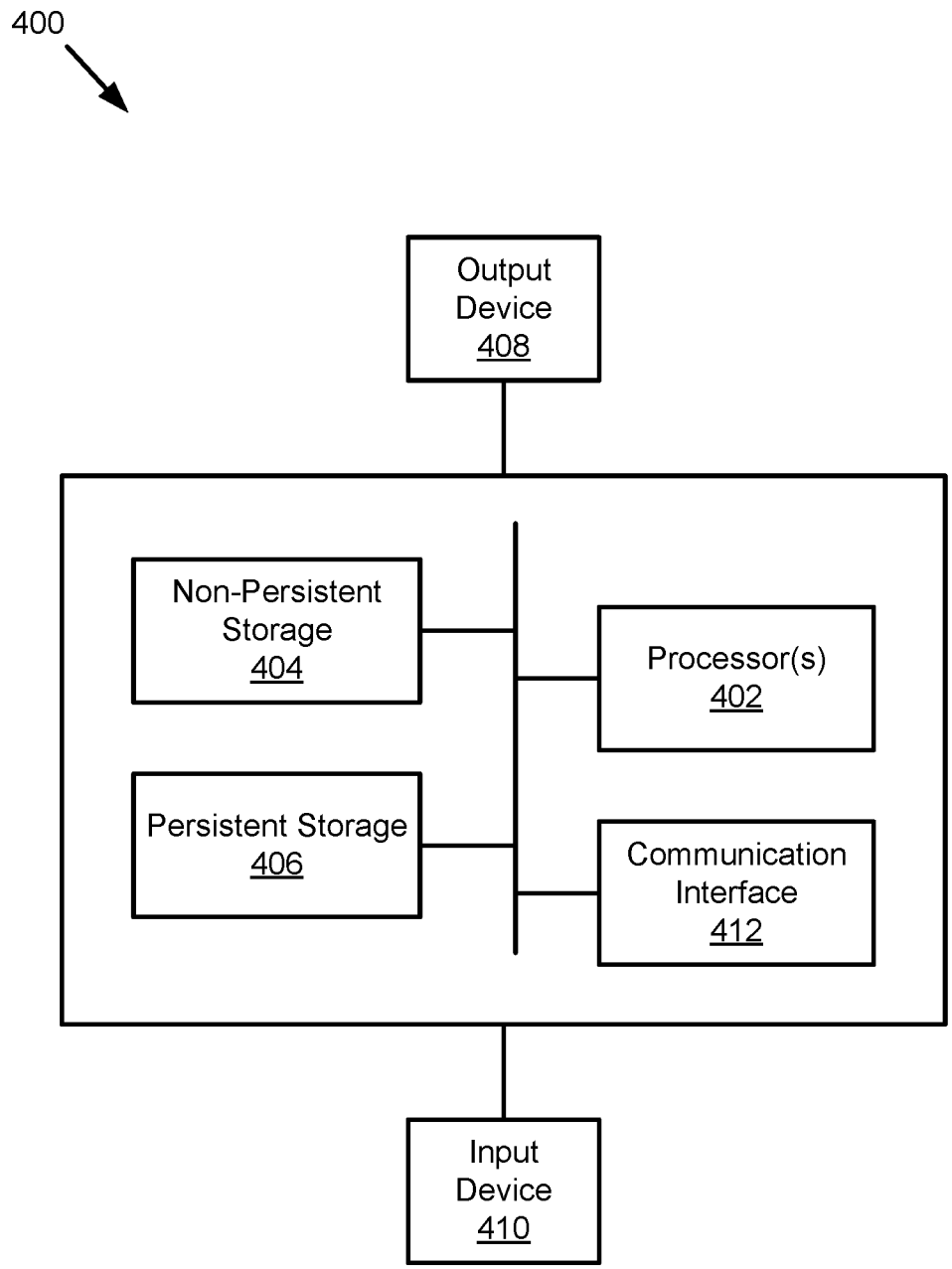
FIG. 4 shows a diagram of a computing device in accordance with one or more embodiments of the invention.

In one or more embodiments of the invention, the client device (112) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, solid-state drives (SSDs), etc.). The computing device may include instructions, stored in the persistent storage, that when executed by the processor(s) of the computing device, cause the computing device to perform the functionality of the client device (112) described throughout this application.

Alternatively, in one or more embodiments of the invention, the client device (112) may be implemented as a logical device. The logical device may utilize the computing resources of any number of computing devices to provide the functionality of the client device (112) described throughout this application.

In one or more embodiments of the invention, the network monitoring agent (122) may monitor network traffic in the network (120) (e.g., the communication network) to obtain a dataset. In one or more embodiments, the dataset may include, but is not limited to: a request, a response to a request, corresponding response time for a request, etc. The request and the response to the request may be communicated over the network (120). In one or more embodiments, the corresponding response time may be a period of time, with a definite start and end, within which a response process is set to be completed.

In one or more embodiments of the invention, the network monitoring agent (122) may periodically obtain the dataset from the network traffic. The network monitoring agent (122) may also obtain the dataset from the network traffic in real-time (e.g., on the order of milliseconds or less).

In one or more embodiments of the invention, the network traffic is an amount of data (e.g., information) moving across the network (120) at any given time. For example, in search engine optimization, the network traffic may be characterized as being either direct, organic, or paid. In one or more embodiments, direct network traffic may be initiated (e.g., instantiated, executed, etc.) when the user and/or the administrator of the client device (112) types a website's uniform resource locator (URL) in a web browser (e.g., a computer program for displaying and navigating between web pages). In one or more embodiments, organic network traffic may be initiated when the user and/or the administrator uses a search engine of a web browser to locate information in web pages. The search engine may be a computer program that searches for and identifies information in a database that corresponds to keywords or characters specified by the user and/or the administrator. In one or more embodiments, paid network traffic may be initiated when the user and/or the administrator clicks on an advertisement on a web page.

As yet another example, in data center administration, the network traffic may be characterized as either being north-south or east-west. In one or more embodiments, the north-south network traffic may be client-to-server network traffic that operates between the client device (112) (or the CE (110)) and the server (132) (or the PHE (130)). In one or more embodiments, the east-west network traffic may be server-to-server network traffic that operates between servers within a data center (e.g., the PHE (130)).

In one or more embodiments of the invention, before communicating data over the network (120), the data may first be broken into smaller batches (e.g., data packets) so that larger size data can be communicated efficiently. In one or more embodiments, network-enabled subcomponents (discussed below) of the network (120) may break data into data packets. The network-enabled subcomponents may then route each data packet in the network (120) to distribute the network traffic uniformly.

In one or more embodiments of the invention, the network-enabled subcomponents may decide how real-time network traffic and non-real-time network traffic should be managed in the network (120). In one or more embodiments, the real-time network traffic may be high priority (e.g., urgent) network traffic. For this reason, data packets of the real-time network traffic may need to be prioritized in the network (120). The real-time network traffic may include data packets related to, for example: videoconferencing, web browsing, voice over Internet Protocol (VoIP), etc.

In one or more embodiments, the non-real-time network traffic may be low priority (e.g., non-urgent) network traffic. For this reason, data packets of the non-real-time network traffic may not need to be prioritized in the network (120). The non-real-time network traffic may include data packets related to, for example: File Transfer Protocol (FTP) for web publishing, email applications, etc.

In one or more embodiments of the invention, the network monitoring agent (122) may also monitor the network traffic to determine, for example: network availability, unusual activities on a network, etc. In one or more embodiments, an unusual activity (e.g., an unusually high amount of network traffic) on the network (120) may be a sign of a security issue (e.g., a malicious attack). Because of a determined unusual activity, the network monitoring agent (122) may notify an administrator (e.g., a network service provider (NSP) (discussed below)) of the network (120). Based on receiving the notification from the network monitoring agent (122), the NSP of the network (120) may reconfigure the network (120) to fix the security issue.

In one or more embodiments of the invention, because of increased network traffic, the network monitoring agent (122) may determine latency (e.g., delay) in the network (120). Because of the latency, the network monitoring agent (122) may also notify the NSP. Based on receiving the notification from the network monitoring agent (122), the NSP may also reconfigure the network (120) to minimize the latency.

In one or more embodiments of the invention, the network monitoring agent (122) may store the dataset in the storage (140). In one or more embodiments, the storage (140) may provide data storage services. For example, the storage (140) may store backups of the client device (112). The storage (140) may also provide copies of previously stored backups of the client device (112). The system (100) may include any number of storages without departing from the scope of the invention.

In one or more embodiments of the invention, the storage (140) may be a physical computer readable storage medium. In one or more embodiments, the physical computer readable storage medium may be (or may include), for example: hard disk drives, SSDs, tape drives, etc. Additionally, the storage (140) may be virtualized storage without departing from the scope of the invention.

In one or more embodiments of the invention, the storage (140) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the storage (140) described throughout this application.

Alternatively, in one or more embodiments of the invention, similar to the client device (112), the storage (140) may also be implemented as a logical device.

In one or more embodiments of the invention, the network monitoring agent (122) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the network monitoring agent (122) described throughout this application.

Alternatively, in one or more embodiments of the invention, similar to the client device (112), the network monitoring agent (122) may also be implemented as a logical device.

In one or more embodiments of the invention, the client device (112) and the server (132) may be operatively connected via the network (120). In one or more embodiments, the network (120) may include two or more computing devices that are connected via any combination of wired and/or wireless connections. The network (120) may be, for example: a local area network (LAN), a wide area network (WAN), a mobile network, a wireless LAN (WLAN), etc. The network (120) may encompass various interconnected, network-enabled subcomponents (not shown) (e.g., switches, routers, gateways, etc.) that may facilitate communications between the above-mentioned system (100) components.

In one or more embodiments of the invention, the network-enabled subcomponents may be capable of: (i) performing one or more communication schemes (e.g., Internet protocol communications, Ethernet communications, etc.), (ii) being configured by one or more computing devices in the network, and (iii) limiting communication(s) on a granular level (e.g., on a per-port level, on a per-sending device level, etc.).

In one or more embodiments of the invention, the NSP may, for example: (i) provide high-speed backbone Internet connectivity to the users of the network (120) and (ii) manage the network (120). Based on a user preference(s), the NSP may provide various levels of Internet connectivity to the user. For example, consider a scenario in which a user of the network (120) has a low BW network connection (e.g., a 3 Gigabytes per second (GB/s) BW with 35 ms latency Quality of Service (QoS) network connection). In this scenario, the user wants to have a high BW network connection (e.g., a 7 GB/s BW with 15 ms latency QoS network connection). For this reason, the user sends a request to the NSP to increase BW of the network connection. Based on receiving the request from the user, the NSP reconfigures the network-enabled subcomponents to provide the high BW network connection to the user.

In one or more embodiments of the invention, a BW of a network connection may refer to a volume of data that can be transmitted over the network (120) in a transmission window. The transmission window may be a period of time, with a definite start and end, within which a data transmission is set to be completed.

In one or more embodiments of the invention, the server (132) may provide computer-implemented services (e.g., receiving a request, sending a response to the request, etc.) to the client device (112). In one or more embodiments, the request may be, for example: a web browser search request, a representational state transfer (REST) request, etc. To provide the computer-implemented services to the client device (112), the server (132) may perform computations locally (e.g., at the PHE (130)) and/or remotely (e.g., away from the PHE (130)). By doing so, the server (132) may utilize different computing devices (e.g., 400, FIG. 4) that have different quantities of computing resources (e.g., processing cycles, memory, storage, etc.) to provide a consistent user experience to the user of the client device (112).

In one or more embodiments of the invention, to provide the aforementioned computer-implemented services, the server (132) processes a request received from the client device (112) and sends a response to the client device (112) for the request. In one or more embodiments, the server (132) may receive and respond to the request over the network (120). For example consider a scenario in which the user of the client device (112) opens a web browser, types an email application's URL into the web browser, and clicks a search button (physical or virtual). In this scenario, the user may execute the above-mentioned actions on a graphical user interface (GUI).

In one or more embodiments, the GUI may be displayed on a display of the computing device (e.g., 400, FIG. 4) using functionalities of a display engine (not shown), in which the display engine is operatively connected to the computing device. The display engine may be implemented using hardware, software, or any combination thereof. The user may execute the above-mentioned actions in any visual format that would allow the user to easily comprehend (e.g., read and parse) the listed information.

Continuing with the example, the client device (112) sends a first REST request to the server (132) to display a login web page of the email application. Based on receiving the first REST request, the server (132) sends the login web page to the client device (112) as a first REST response. Once the login web page is displayed, the user enters information (e.g., username, password, etc.) on the GUI. At this point in time, the client device (112) sends a second REST request to the server (132) to login the email application, in which the second REST request includes the information. Based on receiving the second REST request, the server (132) determines the validity of the information. If the information is valid, the server (132) sends a profile web page of the email application to the client device (112) as a second REST response. Based on receiving the second REST response, the user can successfully log into the profile web page. The aforementioned example is not intended to limit the scope of the invention.

In one or more embodiments of the invention, the server (132) may be, for example: a web server, an email server, etc. In one or more embodiments, the web server may specify web pages and execute applications through web browsers. The web server may also back up assets (e.g., files, folders, etc.) of the client device (112) to an archive location (e.g., a cloud resource). In one or more embodiments, the email server sends and receives email messages. The client device (112) may use Internet messaging access protocol (IMAP) or post office protocol (POP) to retrieve messages (e.g., emails) from the email server. To send messages back to the email server, the client device (112) may use simple mail transfer protocol (SMTP). The aforementioned examples are not intended to limit the scope of the invention.

In one or more embodiments of the invention, the server (132) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the server (132) described throughout this application.

Alternatively, in one or more embodiments of the invention, similar to the client device (112), the server (132) may also be implemented as a logical device.

In one or more embodiments of the invention, the statistical modeling module (150) may obtain the dataset from the storage (140) to execute a statistical model (e.g., k-nearest neighbor (KNN) model). The statistical modeling module (150) may execute the KNN model to extract one or more request categories from the dataset. In one or more embodiments, the KNN model may group (or classify) similar requests into BW levels (e.g., a high BW request, a low BW request). In one or more embodiments, the KNN model may use all of the network traffic attributes available in the dataset to extract the request categories. The network traffic attributes may include, but are not limited to: a request type, a response type, a requested service type, corresponding response time for a request, size of a request, size of a response, etc.

The KNN model is a non-parametric, supervised machine learning (ML) classifier, which uses proximity to classify an individual data point. The KNN model: (i) identifies the nearest neighbors of a given query point so that the model can assign a class to that point and (ii) operates based on the assumption that similar data points can be found near one another. In order to determine which data points are closest to a given query point, the KNN model calculates the distance between the query point and the other data points. This calculation provides information to generate decision boundaries, which separates one or more query points into different regions. The KNN model may calculate the distance between the query point and the other data points using Euclidean distance formula.

The k value in the KNN model defines how many neighbors will be checked to determine the classification of the query point. For example, based on the network traffic attributes (discussed above), if k=1, the instance will be assigned to the same class as its single nearest neighbor. As yet another example, if k=3, the KNN model calculates the Euclidean distance of three neighbors to determine the three nearest neighbors. The model counts the number of data points in each class. The model then assigns a new data point to a class in which the number of neighbors is maximum.

In one or more embodiments, defining the k value can be a balancing act as different k values may lead to overfitting or underfitting. For example, lower values of k can have high variance but low bias, and higher values of k can have low variance but high bias. In the KNN model, the choice of k value depends on input data as the input data with more noise will perform better with the higher values of k. To avoid ties in classification, an odd number of k value (e.g., k=1, 3, 5, etc.) should be used in the KNN model.

In one or more embodiments, for example, consider a scenario in which the dataset includes attributes of four different requests: (a) (i) a first REST request (e.g., 15 Megabytes (MB) in size), (ii) a first REST response (e.g., 2 GB in size) to the first REST request, and (iii) corresponding response time (e.g., 5 minutes) to send the first REST response; (b) (i) a second REST request (e.g., 25 MB in size), (ii) a second REST response (e.g., 1 GB in size) to the second REST request, and (iii) corresponding response time (e.g., 3 minutes) to send the second REST response; (c) (i) a first web browser search request (e.g., 2 MB in size), (ii) a first response (e.g., 80 MB in size) to the first web browser search request, and (iii) corresponding response time (e.g., 20 seconds) to send the first response; and (d) (i) a second web browser search request (e.g., 5 MB in size), (ii) a second response (e.g., 160 MB in size) to the second web browser search request, and (iii) corresponding response time (e.g., 40 seconds) to send the second response.

In this scenario, based on the above-discussed attributes of the requests, the KNN model may group the requests into two request categories: (i) a high BW request and (ii) a low BW request. In one example, the first and second REST requests are classified as high BW requests, and the first and second web browser search requests are classified as low BW requests.

The aforementioned example is not intended to limit the scope of the invention.

In one or more embodiments of the invention, if the KNN model determines none of the requests are similar (e.g., all of the requests are unique), the KNN model may generate a separate request category for all non-similar requests.

In one or more embodiments of the invention, the statistical modeling module (150) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the statistical modeling module (150) described throughout this application.

Alternatively, in one or more embodiments of the invention, similar to the client device (112), the statistical modeling module (150) may also be implemented as a logical device.

Figure 2:
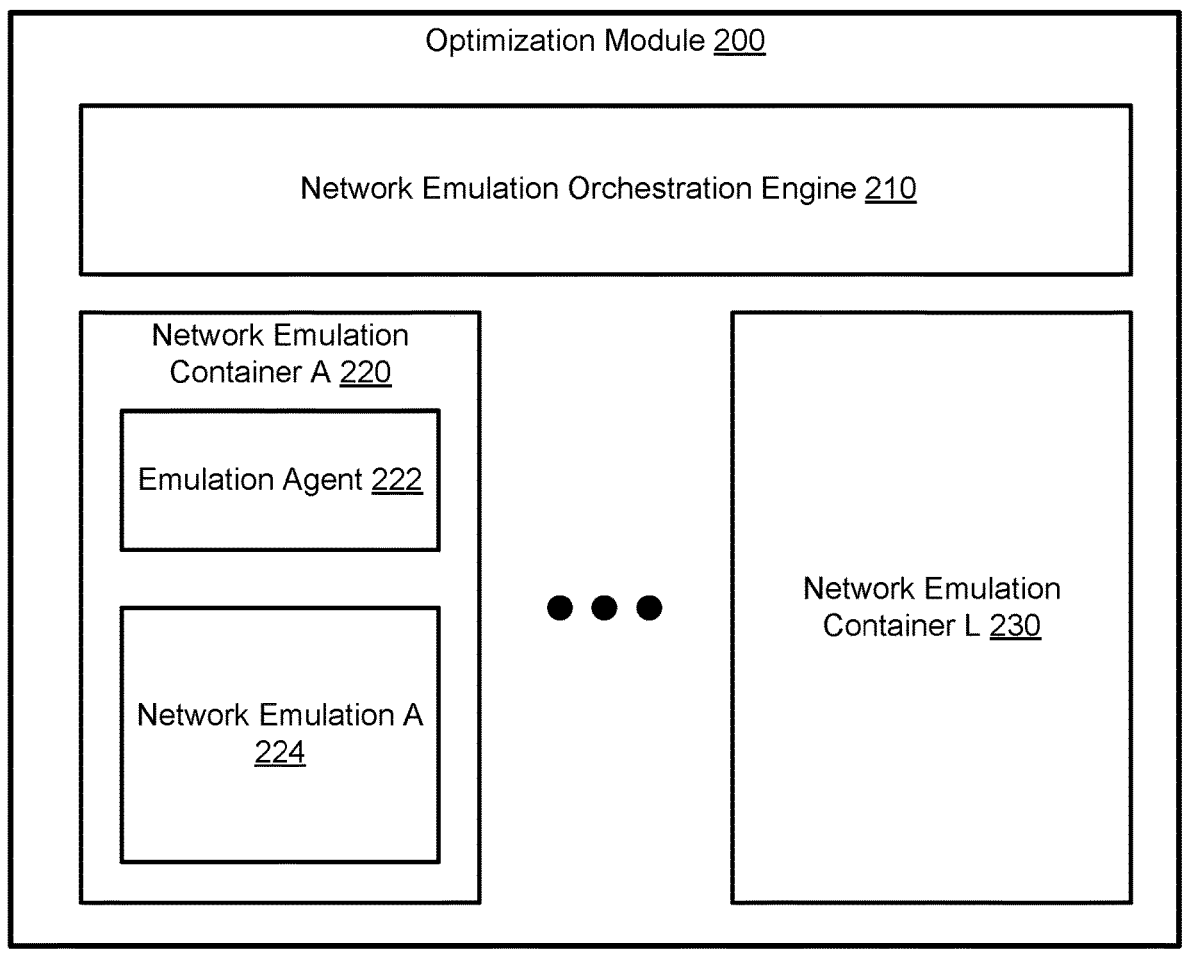
FIG. 2 shows a diagram of an optimization module in accordance with one or more embodiments of the invention.

In one or more embodiments of the invention, the optimization module (160) may include a network emulation orchestration engine (e.g., 210, FIG. 2) and network emulation containers (e.g., network emulation container A (220), network emulation container L (230), FIG. 2). Additional details of these components of the optimization module are described below in reference to FIG. 2.

In one or more embodiments of the invention, the optimization module (160) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the optimization module (160) described throughout this application.

Alternatively, in one or more embodiments of the invention, similar to the client device (112), the optimization module (160) may also be implemented as a logical device.

Turning now to FIG. 2, FIG. 2 shows a diagram of an optimization module (200) in accordance with one or more embodiments of the invention. The optimization module (200) may be an example of the optimization module (e.g., 160, FIG. 1) discussed above, in which the optimization module (e.g., 160, FIG. 1) emulates the network (e.g., 120, FIG. 1). The optimization module (200) may include the network emulation orchestration engine (210) and one or more network emulation containers (network emulation container A (220), network emulation container L (230)). The optimization module (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments of the invention, the network emulation orchestration engine (210) orchestrates the generation of the network emulation containers (network emulation container A (220), network emulation container L (230)). For example, the network emulation orchestration engine (210) may receive request(s) from the statistical modeling module (e.g., 150, FIG. 1) to emulate network traffic of the network (e.g., 120, FIG. 1) on an emulated network (e.g., network emulation A (224)). The network emulation orchestration engine (210) may then initiate the emulation of the network (e.g., 120, FIG. 1).

In one or more embodiments of the invention, the network emulation orchestration engine (210) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the network emulation orchestration engine (210) described throughout this application.

Alternatively, in one or more embodiments of the invention, similar to the client device (e.g., 112, FIG. 1), the network emulation orchestration engine (210) may also be implemented as a logical device.

In one or more embodiments of the invention, the network emulation containers (network emulation container A (220), network emulation container L (230)) may include the emulation agent (222) and the emulated network (network emulation A (224)). In one or more embodiments, the statistical orchestration engine (e.g., 150, FIG. 1) sends the categorized requests (or a subset thereof) to the network emulation orchestration engine (210), which further sends the received categorized requests to the emulation agent (222). Based on receiving the categorized requests, the emulation agent (222) may generate network slices for each of the request categories, where the network slices are intended to emulate the operation of a potential newer communication network.

In one or more embodiments of the invention, based on the example discussed above in FIG. 1, the emulation agent (222) may generate a high BW network slice and a low BW network slice to emulate the network (e.g., 120, FIG. 1). In one or more embodiments, network slicing may be a form of virtual network architecture that enables one or more logical networks to be executed on top of the network (e.g., 120, FIG. 1). To be able to execute the logical networks on top of the network (e.g., 120, FIG. 1), the network slicing may use, for example: a software defined networking (SDN) method, a network function virtualization (NFV) method, etc.

In one or more embodiments of the invention, each logical network, referred to as a "network slice", may encompass an end-to-end virtual network with dedicated storage and/or computing resources. In one or more embodiments, each network slice may, for example: implement a set of network functions, be configured to execute a different set of requirements and/or priorities, be associated with a particular class, etc.

In one or more embodiments of the invention, to be able to emulate the transmission large volume of data, the emulation agent (222) may allocate more network capacity to the high BW network slice than the low BW network slice. For example, the emulation agent (222) may allocate a 10 GB/s BW with 10 ms latency QoS network capacity to the high BW network slice and a 1 GB/s BW with 45 ms latency QoS network capacity to the low BW network slice.

In one or more embodiments of the invention, a BW of a network slice may refer to a volume of data that can be transmitted over the network slice in a transmission window.

In one or more embodiments of the invention, to emulate the network traffic on the network slices, the emulation agent (222) may obtain a set of requests and a set of corresponding response times (also referred to herein as "a set of initial response times") from the storage (e.g., 140, FIG. 1). Based on the example discussed above in FIG. 1, the emulation agent (222) may obtain: (i) the first REST request, (ii) the second REST request, (iii) the first web browser search request, (iv) the second web browser search request, (v) the initial response time (e.g., 5 minutes) for the first REST request, (vi) the initial response time (e.g., 3 minutes) for the second REST request, (vii) the initial response time (e.g., 20 seconds) for the first web browser search request, and (viii) the initial response time (e.g., 40 seconds) for the second web browser search request.

In one or more embodiments, the emulation agent (222) may then determine an appropriate network slice for each request and map each request to the appropriate network slice. For example, the emulation agent (222) may map the first and second REST requests to the high BW network slice, and map the first and second web browser search requests to the low BW network slice.

Thereafter, the emulation agent (222) may execute an emulation of the network (e.g., 120, FIG. 1), using the network slices and the set of requests, to generate emulated response times for the set of requests. Based on the example discussed above, the emulation agent (222) may execute the emulation using the high BW network slice and the low BW network slice. As a result of the emulation, the emulation agent (222) may obtain the emulated response times for: (i) the first and second REST requests and (ii) the first and second web browser search requests.

In one or more embodiments of the invention, the emulation agent (222) may compare the emulated response times against the initial response times. Based on the comparison, the emulation agent (222) may determine a response time variation for each request using the following rule: ((emulated response time−initial response time)/(initial response time))×100%. As a result of the determination, a negative (e.g., −60%, −45%, etc.) response time variation specifies that the emulated network provides better communication performance than the current network (or the network (e.g., 120, FIG. 1)) for a corresponding request. A positive (e.g., 15%, 35%, etc.) response time variation specifies that the emulated network provides worse communication performance than the current network for the corresponding request.

For example, consider a scenario in which the emulated response time for: (i) the first REST request is 2 minutes, (ii) the second REST request is 1 minute, (iii) the first web browser search request is 10 seconds, and (iv) the second web browser search request is 20 seconds. In this scenario, based on the above-discussed rule, the emulation agent (222) determines response time variations for the set of requests as: (i) ((2 minutes−5 minutes)/(5 minutes))×100%=−60% for the first REST request, (ii) ((1 minute−3 minutes)/(3 minutes))×100%=−67% for the second REST request, (iii) ((10 seconds−20 seconds)/(20 seconds))×100%=−50% for the first web browser search request, and (iv) ((20 seconds−40 seconds)/(40 seconds))×100%=−50% for the second web browser search request.

As yet another example, consider a scenario in which the emulated response time for: (i) the first REST request is 6 minutes, (ii) the second REST request is 3 minute, (iii) the first web browser search request is 25 seconds, and (iv) the second web browser search request is 42 seconds. In this scenario, based on the above-discussed rule, the emulation agent (222) determines the response time variations for the set of requests as: (i) ((6 minutes−5 minutes)/(5 minutes))×100%=20% for the first REST request, (ii) ((3 minute−3 minutes)/(3 minutes))×100%=0% for the second REST request, (iii) ((25 seconds−20 seconds)/(20 seconds))×100%=20% for the first web browser search request, and (iv) ((42 seconds−40 seconds)/(40 seconds))×100%=5% for the second web browser search request.

The aforementioned examples are not intended to limit the scope of the invention.

In one or more embodiments, after determining the response time variations for the requests, the emulation agent (222) sends an average of the response time variations to the network emulation orchestration engine (210). Based on the average response time variation, the network emulation orchestration engine (210) may generate an upgrade recommendation for the network (e.g., 120, FIG. 1). For example, if the average response time variation specifies a negative value (e.g., −50%), the network emulation orchestration engine (210) may recommend upgrading the network (e.g., 120, FIG. 1) to the newer communication network. If the average response time variation specifies a positive value (e.g., 50%), the network emulation orchestration engine (210) may recommend not upgrading the network (e.g., 120, FIG. 1) to the newer communication network. Lastly, if there is no change in the initial response times, the network emulation orchestration engine (210) may also recommend not upgrading the network (e.g., 120, FIG. 1) to the newer communication network.

In one or more embodiments of the invention, the network emulation orchestration engine (210) may then send the upgrade recommendation to the user and/or the administrator of the client device (e.g., 112, FIG. 1). Additional details of sending the upgrade recommendation are described below in reference to FIG. 3.3.

In one or more embodiments of the invention, the emulation agent (222) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the emulation agent (222) described throughout this application.

Alternatively, in one or more embodiments of the invention, similar to the client device (e.g., 112, FIG. 1), the emulation agent (222) may also be implemented as a logical device.

FIGS. 3.1-3.3 show a method for generating an upgrade recommendation for a network in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.1, the method shown in FIG. 3.1 may be executed by, for example, the above-discussed server (e.g., 132, FIG. 1) and the network monitoring agent (e.g., 122, FIG. 1). Other components of the system (100) illustrated in FIG. 1 may also execute all or part of the method shown in FIG. 3.1 without departing from the scope of the invention.

In Step 300, the server receives a set of requests from the client device (e.g., 112, FIG. 1) over the network (e.g., 120, FIG. 1). In one or more embodiments, the set of requests may include, but are not limited to: a REST request, a web browser search request, etc.

In Step 302, for each request, the server sends a corresponding response back to the client device over the network. In one or more embodiments, the response may be, for example: a response to a REST request, a response to a web browser search request, etc.

In Step 304, the network monitoring agent monitors network traffic over the network to obtain a dataset. In one or more embodiments, the dataset may include, but is not limited to: a set of requests, a set of responses, a set of initial response times, etc. Details of the network traffic and of the dataset have been described above in reference to FIG. 1.

In Step 306, the network monitoring agent stores the dataset in storage (e.g., 140, FIG. 1).

In one or more embodiments of the invention, the method may end following Step 306.

Turning now to FIG. 3.2, the method shown in FIG. 3.2 may be executed by, for example, the above-discussed statistical modeling module (e.g., 150, FIG. 1), the network emulation orchestration engine (e.g., 210, FIG. 2), and the emulation agent (e.g., 222, FIG. 2). Other components of the system (100) illustrated in FIG. 1 may also execute all or part of the method shown in FIG. 3.2 without departing from the scope of the invention.

In Step 308, at some later point in time, the statistical modeling module receives a network upgrade recommendation request from a requesting entity. In one or more embodiments, the requesting entity may be, for example: a user of a client device, an administrator of a client device, etc. The network upgrade recommendation request specifies a newer communication network (or a different communication network), in which the communication network is currently being used for communication between the CE and the PHE.

In Step 310, based on receiving the upgrade recommendation request, the statistical modeling module obtains the dataset from the storage.

In Step, 312, the statistical modeling module analyzes the dataset to generate one or more request categories (e.g., a high BW request, a low BW request, etc.). In one or more embodiments, the statistical modeling module implements the KNN model to analyze the dataset and to generate the request categories. Details of the analysis and of the requests have been described above in reference to FIG. 1.

In Step 314, the statistical modeling module sends the categorized requests (or portions thereof) to the network emulation orchestration engine.

In Step 316, the network emulation orchestration engine sends the categorized requests to the emulation agent.

In Step 318, the emulation agent generates network slices for each of the request categories of the received categorized requests. In one or more embodiments, the emulation agent may generate, for example: a high BW network slice, a low BW network slice, etc. Details of the network slices have been described above in reference to FIG. 2. The network slices are configured to emulate the newer communication network (or the different communication network).

In Step 320, the emulation agent obtains the set of initial response times from the storage corresponding to the received categorized requests.

Turning now to FIG. 3.3, the method shown in FIG. 3.3 may be executed by, for example, the above-discussed network emulation orchestration engine and the emulation agent. Other components of the system (100) illustrated in FIG. 1 may also execute all or part of the method shown in FIG. 3.3 without departing from the scope of the invention.

In Step 322, the emulation agent executes, using the network slices and the categorized requests, an emulation to generate emulated response times for the requests. Based on the examples discussed above in Step 300 of FIG. 3.1 and in Step 318 of FIG. 3.2, the emulation agent maps the REST request to the high BW network slice and maps the web browser search request to the low BW network slice. The emulation agent then executes the emulation using the high BW network slice and the low BW network slice.

In Step 324, the emulation agent compares the emulated response times against the initial response times.

In Step 326, based on the comparison, the emulation agent determines an average response time variation for the requests. In one or more embodiments, the determination may specify: (i) a positive average response time variation, (ii) a negative average response time variation, or (iii) no change in the initial response times. Details of the determination have been described above in reference to FIG. 2.

In Step 328, the emulation agent sends the average response time variation to the network emulation orchestration engine.

In Step 330, based on the average response time variation, the network emulation orchestration engine generates an upgrade recommendation for the network. In one or more embodiments, the upgrade recommendation may recommend upgrading the network to the newer (or different) communication network or recommend not upgrading the network to the newer (or different) communication network. In one or more embodiments, because of its higher BW, the newer (or different) communication network may provide better communication performance than the communication network.

In Step 332, the network emulation orchestration engine sends the upgrade recommendation to the client device. The client device may then notify, via the GUI, the requesting entity about the upgrade recommendation.

In one or more embodiments, based on the upgrade recommendation, the requesting entity may initiate a transition (e.g., a migration) from the network to the newer communication network. For this purpose, the requesting entity sends a migration request (e.g., a migration to the newer communication network request) to NSP. Based on receiving the migration request from the requesting entity, the NSP may reconfigure the network-enabled subcomponents of the network to implement the newer communication network. Once the network-enabled subcomponents are reconfigured, the requesting entity can be migrated to the newer communication network.

In one or more embodiments of the invention, the method may end following Step 332.

Turning now to FIG. 4, FIG. 4 shows a diagram of a computing device in accordance with one or more embodiments of the invention.

In one or more embodiments of the invention, the computing device (400) may include one or more computer processors (402), non-persistent storage (404) (e.g., volatile memory, such as RAM, cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a LAN, a WAN, such as the Internet, mobile network, or any other type of network) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for generating an upgrade recommendation for a communication network (CN), the method comprising:
    at a first point-in-time:
        monitoring network traffic over the CN to periodically obtain a dataset, wherein the monitoring is performed, in part, to determine unusual network activity occurring on the CN and network availability of the CN, wherein a network service provider (NSP) is notified in response to the determination of the unusual network activity on the CN and the network availability of the CN; and
        storing the dataset in storage;
    at a second point-in-time that is after the first point-in-time:
        receiving a CN upgrade recommendation request from a user, wherein, upon receiving the CN upgrade recommendation request, the dataset is obtained from the storage, wherein the CN upgrade recommendation request specifies a second CN that the user wants to upgrade;
        analyzing the dataset to generate a request category, wherein the dataset comprises at least a request, a response to the request, and a corresponding response time for the request, wherein the request and the response are communicated over the CN, wherein the dataset is analyzed using a k-nearest neighbor (KNN) statistical classification model to generate the request category, wherein, to generate the request category, the KNN model uses at least a type of the request, a type of the response, a type of a request service, the corresponding response time, a size of the request, and a size of the response specified in the dataset;
        generating a network slice corresponding to the request category, wherein the network slice is configured to emulate the network traffic over the CN on the second CN;
        executing an emulation using the network slice and the request to generate an emulated response time for the request;
        comparing the emulated response time against the corresponding response time;
        determining, based on the comparison, a response time variation for the request;
        generating the upgrade recommendation based on the response time variation; and
        sending the upgrade recommendation to the user, wherein, in response to receiving the recommendation, the user sends a migration request to the NSP to initiate a transition from the CN to the second CN.

2. The method of claim 1, further comprising:
    initiating the transition from the CN to the second CN in response to the upgrade recommendation.

3. The method of claim 1, wherein the request category is a low bandwidth request.

4. The method of claim 1, wherein the request category is a high bandwidth request.

5. The method of claim 1, wherein the network slice is a low bandwidth network slice.

6. The method of claim 1, wherein the network slice is a high bandwidth network slice.

7. The method of claim 1,
    wherein the request is issued by a client device;
    wherein the response is issued by a server;
    wherein the client device and the server communicate over the CN;
    wherein the upgrade recommendation specifies that the client device should communicate with the server using the second CN.

8. The method of claim 7, wherein the second CN has a higher bandwidth than the CN.

9. A non-transitory computer readable medium comprising computer readable program code, which when executed by a computer processor enables the computer processor to perform a method for generating an upgrade recommendation for a communication network (CN), the method comprising:
    at a first point-in-time:
        monitoring network traffic over the CN to periodically obtain a dataset, wherein the monitoring is performed, in part, to determine unusual network activity occurring on the CN and network availability of the CN, wherein a network service provider (NSP) is notified in response to the determination of the unusual network activity on the CN and the network availability of the CN; and
        storing the dataset in storage;
    at a second point-in-time that is after the first point-in-time:
        receiving a CN upgrade recommendation request from a user, wherein, upon receiving the CN upgrade recommendation request, the dataset is obtained from the storage, wherein the CN upgrade recommendation request specifies a second CN that the user wants to upgrade;

analyzing the dataset to generate a request category, wherein the dataset comprises at least a request, a response to the request, and a corresponding response time for the request, wherein the request and the response are communicated over the CN, wherein the dataset is analyzed using a k-nearest neighbor (KNN) statistical classification model to generate the request category, wherein, to generate the request category, the KNN model uses at least a type of the request, a type of the response, a type of a request service, the corresponding response time, a size of the request, and a size of the response specified in the dataset;

generating a network slice corresponding to the request category, wherein the network slice is configured to emulate the network traffic over the CN on the second CN;

executing an emulation using the network slice and the request to generate an emulated response time for the request;

comparing the emulated response time against the corresponding response time;

determining, based on the comparison, a response time variation for the request;

generating the upgrade recommendation based on the response time variation; and sending the upgrade recommendation to the user, wherein, in response to receiving the recommendation, the user sends a migration request to the NSP to initiate a transition from the CN to the second CN.

10. The non-transitory computer readable medium of claim 9, further comprising:

initiating the transition from the CN to the second CN in response to the upgrade recommendation.

11. The non-transitory computer readable medium of claim 9, wherein the request category is a low bandwidth request.

12. The non-transitory computer readable medium of claim 9, wherein the request category is a high bandwidth request.

13. A system for generating an upgrade recommendation for a communication network (CN), the system comprising:

a processor comprising circuitry;

memory comprising instructions, which when executed perform a method, the method comprising:

at a first point-in-time:

monitoring network traffic over the CN to periodically obtain a dataset, wherein the monitoring is performed, in part, to determine unusual network activity occurring on the CN and network availability of the CN, wherein a network service provider (NSP) is notified in response to the determination of the unusual network activity on the CN and the network availability of the CN; and storing the dataset in storage;

at a second point-in-time that is after the first point-in-time:

receiving a CN upgrade recommendation request from a user, wherein, upon receiving the CN upgrade recommendation request, the dataset is obtained from the storage, wherein the CN upgrade recommendation request specifies a second CN that the user wants to upgrade;

analyzing the dataset to generate a request category, wherein the dataset comprises at least a request, a response to the request, and a corresponding response time for the request, wherein the request and the response are communicated over the CN, wherein the dataset is analyzed using a k-nearest neighbor (KNN) statistical classification model to generate the request category, wherein, to generate the request category, the KNN model uses at least a type of the request, a type of the response, a type of a request service, the corresponding response time, a size of the request, and a size of the response specified in the dataset;

generating a network slice corresponding to the request category, wherein the network slice is configured to emulate the network traffic over the CN on the second CN;

executing an emulation using the network slice and the request to generate an emulated response time for the request;

comparing the emulated response time against the corresponding response time;

determining, based on the comparison, a response time variation for the request;

generating the upgrade recommendation based on the response time variation; and sending the upgrade recommendation to the user, wherein, in response to receiving the recommendation, the user sends a migration request to the NSP to initiate a transition from the CN to the second CN.

14. The system of claim 13, wherein the network slice is a low bandwidth network slice.

15. The system of claim 13, wherein the network slice is a high bandwidth network slice.

16. The system of claim 13, wherein the request is issued by a client device;

wherein the response is issued by a server;

wherein the client device and the server communicate over the CN;

wherein the upgrade recommendation specifies that the client device should communicate with the server using the second CN.

* * * * *